April 16, 1957 P. H. GUATELLI ET AL 2,788,819
FRUIT CUTTER AND PITTER
Filed Feb. 1, 1954 3 Sheets-Sheet 3
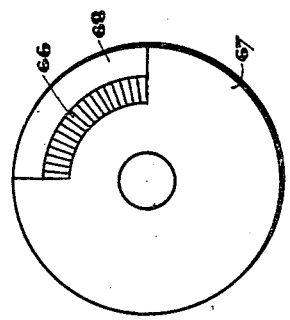
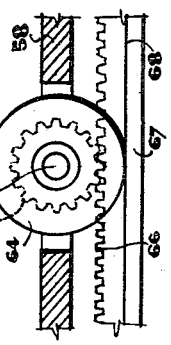
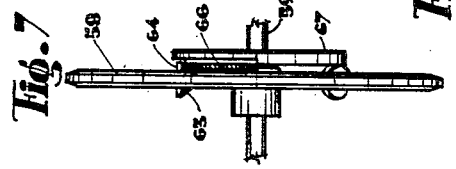
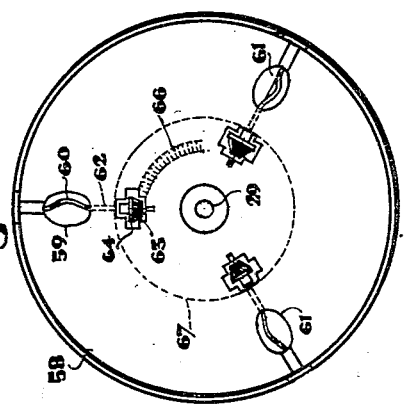
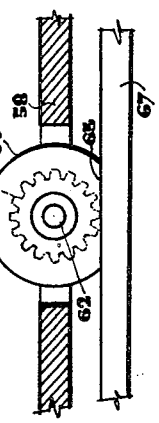
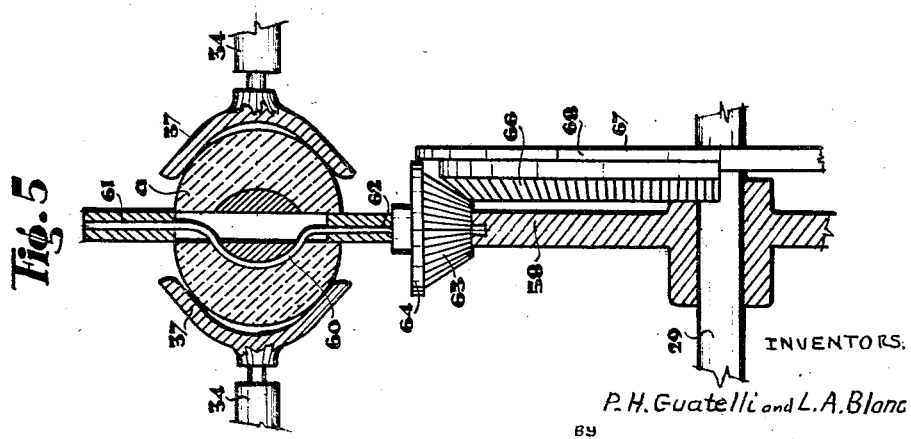
INVENTORS.
P. H. Guatelli and L. A. Blanc
BY
Richards y Geier
ATTORNEYS ously in the course of the description of this specification and will be specifically mentioned in the claims which follow.

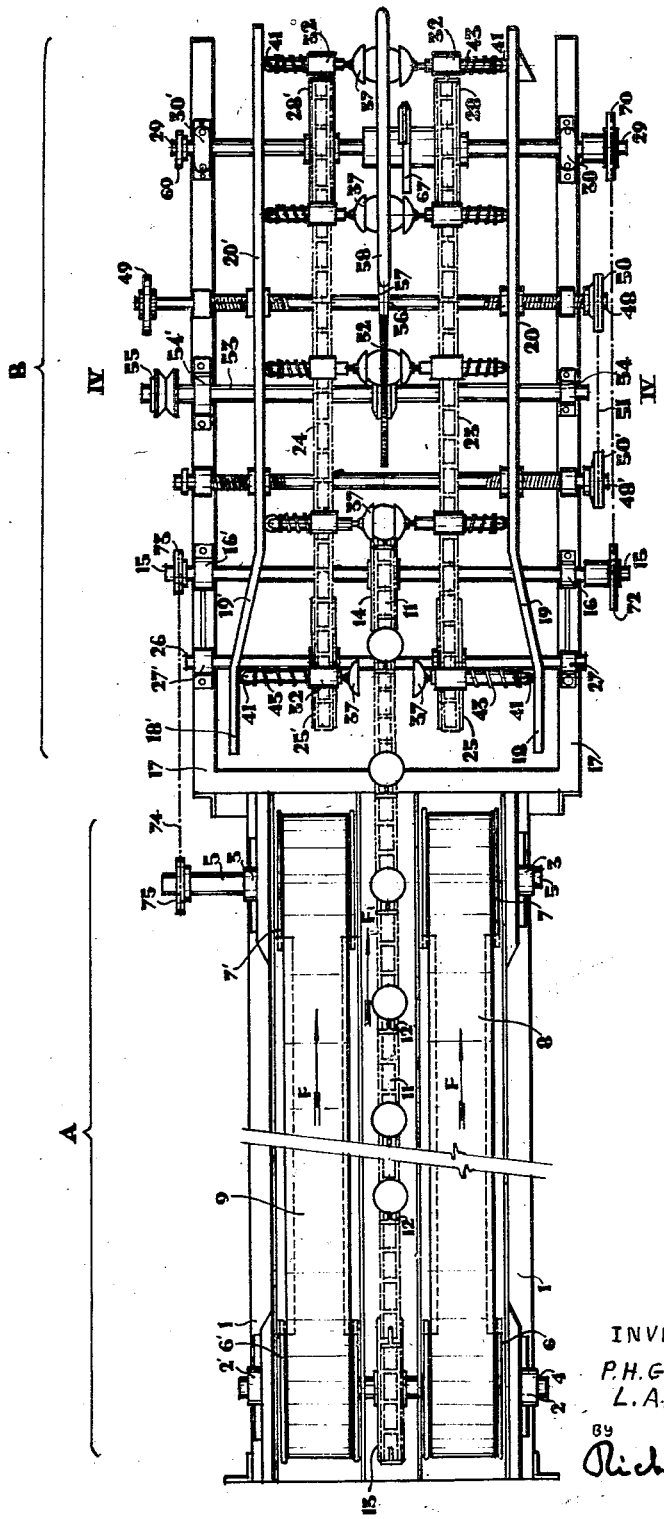

United States Patent Office 2,788,819
Patented Apr. 16, 1957

2,788,819
FRUIT CUTTER AND PITTER

Pedro Hector Guatelli and Luis Alberto Blanc,
Godoy Cruz, Mendoza, Argentina

Application February 1, 1954, Serial No. 407,468

2 Claims. (Cl. 146—28)

The present invention refers to a machine for cutting peaches or similar fruit in halves, extracting the kernel or stone from same, and which has as its finality a combination of co-operative elements, by means of which the above mentioned operation is effected in a very rapid and efficient manner.

In general, the fruit canning establishments dedicated especially to the preparation of peaches and similar fruit for canning, carry out the operation of cutting the peaches in halves and extracting the stones from same manually, which amounts to an excessive loss of time and employment of a great quantity of labour. These factors logically influence the cost of said products. With these inconveniences in mind an effort was made to avoid same by means of a suitable machine. It is therefore an object of the present invention, to obtain a high productiveness in cutting of peaches or similar fruit and in extracting of their stones, thereby contributing in this manner to an efficient economic order in fruit establishments, and to resolve the problems inherent to the excessive use of manual labour.

From the constructive point of view the machine in question is characterized by an endless transporting device capable of carrying the fruit and handing each independent unit to corresponding holding elements. Each of the holding elements is constituted by a pair of axially facing elements, which attempt to join one another to hold the fruit between them. Each pair of elements is mounted on the respective endless transporting belts or chains. The holding elements are joined to guiding members which constitute the means for producing the mutual approach of the elements to maintain the fruit held during the working process of the machine. In its travel, the holding elements transport the fruit toward the radius of action of a revolving circular saw, centrally disposed in the space comprised between the above mentioned transporting belts or chains and parallel to same, the saw dividing the fruit in two parts. Adjoining each face of the saw are disposed corresponding retaining surfaces in order that the two halves which have been cut do not part from the holding elements on leaving the saw, so that during the transportation of same, these carry the above mentioned halves of the fruit and apply them to the faces of a revolving disc. The revolving disc is provided with openings or windows which are disposed corresponding curved knives for extracting the cut portions of the stone or kernel. The holding elements pass in front of said openings carrying the halves of the fruit with them for the action of the above mentioned knives, which have a rotary movement and penetrate between the stone and the pulp, thereby separating them. Said parts now separated, leave the contact surfaces of the disc and on being released by the holding elements, fall into appropriate deposits where they are collected.

In order that the curved knives may separate the stone from the pulp, these, in their rotation project outside the plane of the disc and said rotary movement is produced in the moment in which the fruit, conducted by the holding elements, passes in front of the corresponding window or opening. The knife under this circumstance undertakes a complete turn, while the disc rotates and the elements holding the fruit continue transporting same. All these movements are co-related to one another exhibiting a synchronism of operation.

The machine is furthermore adapted with various construction details which will be made manifest in the course of the description of this specification and will be specifically mentioned in the claims which follow.

In order that the present invention be clearly understood and put into practice with ease, it has been presented in its preferable form of execution in the illustrative drawings which accompany this specification and in which:

Figure 1 represents a schematic plan view of the entire machine, where the travel of the fruit may be noted in its process of being cut and the stone or kernel eliminated.

Figure 2 represents an elevation view of the machine illustrated in the previous figure.

Figure 3 represents an enlarged longitudinal sectional view of one of the elements of the pair which constitute the means for holding the fruit.

Figure 4 represents a transverse sectional view of the machine in accordance with the plane IV—IV of Figure 1.

Figure 5 represents an enlarged transverse sectional view in detail of the knife-holders for extracting the stones and their connection with the means whereby the rotary movement is produced.

Figure 6 represents an enlarged front view of the entire knife-holder disc for extracting the stones showing the relative position of the elements connected to it.

Figure 7 represents a side view of Figure 6.

Figure 8 represents an enlarged front view of a fixed disk, provided with a sector of a circular cog-rail, on which a pinion turns and produces the rotary movement of the knives which extract the stones or kernels.

Figure 9 represents a side view of the disk illustrated in Figure 8.

Figure 10 represents an enlarged detail of the connection between the cog-rail and the pinion for working the knives for extracting the stones, showing the relative position of a disc coupled to said pinion which prevents incorrect displacements of same and therefore of the knife during its down stroke period, and, Figure 11 represents an analogous view to the previous one, but showing the relative position of the elements during the period of operation of same.

In accordance with the accompanying drawings the entire machine comprises two principal parts A and B, the first of which constitutes the part destined for the loading of the fruit to be cut and their stones extracted, and the second constitutes the machine itself. Part A is constituted by a frame 1 on which are secured the corresponding bearings 2—2' and 3—3', which support the shafts 4 and 5 on which the pair of pulleys 6—6' and 7—7' are mounted, leaving between each pair a free space, the finality of which will be explained later. On these pulleys are disposed endless belts 8 and 9, whose tension is controlled by means of the corresponding screws 10 disposed in front of the bearings 3 and 3', which displace these and therefore the shaft 5 as well. In the space between both pulleys, and along same, an endless chain 11 is disposed and provided with spikes or similar elements 12. The chain, by one end of its travel, works on a toothed wheel 13 on shaft 4, while by the other end of its travel advances within the part B, and works on another toothed wheel 14 mounted on a shaft 15 supported in bearings 16—16' which is secured to the structure 17 of the part B of the machine.

The above mentioned part B constitutes the machine itself and has on either side two guides which start with two parallel stretches 18 and 18' followed by some inclined and convergent stretches 19 and 19'. Subsequent thereto are stretches of greater length 20 and 20' which are parallel and nearer to one another than the initial stretches.

Said guides have at their beginning and end, corresponding curved extensions, indicated in Figure 2 by 21 and 22, the finality of which will be explained later.

In the space between said guides and parallel to same, two endless chains or similar elements are disposed 23 and 24, which work with the wheels 25 and 25' at one end of its travel, mounted on a shaft 26, duly supported by bearings 27 and 27', and guided at the other end of the travel by wheels 28 and 28', mounted on the shaft 29 supported in bearings 30 and 30'.

On the above mentioned endless chains 23 and 24, the respective holding elements are secured and disposed in pairs facing one another.

Each element of the pair has been illustrated in detail in Figure 3 and is constituted by a supporting piece 31 which forms a bushing 32. Each piece is secured to a corresponding link 33 of the endless chain 23 or 24 as the case may be.

On said bushing is mounted a sliding piece 34, preferably cylindrical, provided along its length with a perforation 35 where a shaft 36 slides and carries on its outer extremity an expansion or enlarged surface in the form of a cup 37 destined to hold the fruit between it and the other similar cup of the other facing element of the pair. Between the bottom of the cavity 35 and the internal extremity of the shaft 36, a spring 38 is disposed which tends to project the cup 37 outwardly, and said displacement being limited by a screw 39 which fits within a slot 40 of the shaft 36. On the back end of the sliding piece 34 a small wheel 41 is placed mounted on the spindle 42. The wheel is destined to fit within the corresponding lateral guides, as is illustrated in Figure 4. These small wheels of the elements are maintained in contact against the guides due to a helical spring 43 which by one end rest against the bushing 32 and by the other end against a ring 44 supported by a bolt 45 which passes through the sliding piece 34.

As the machine may be utilized to extract the stones or kernels from different sized fruit and in order that same may be perfectly adapted to the work, holding the fruit correctly, the guides constituted by the stretches 18—19—20 and 18'—19'—20', can be displaced parallel to one another. For this reason they are mounted on corresponding supports 46 and 46' (Figure 4). Their lower part is adapted to accommodate the nuts 47 and 47', with reversed threads which fit on the respective threaded spindles 48 and 48'. The first one acts by means of a pulley 49 mounted on one of its extremities, while on the other extremity a toothed wheel 50 is disposed which by means of a chain 51 (Figures 1 and 2) transmits the movement through another similar wheel 50', to the other spindle 48', so that in accordance with the direction of rotation of the pulley 49 the guides will approach or recede from one another.

Between the above mentioned guides and lined up with the endless chain for the transportation of the fruit, a circular saw 52 is disposed and mounted on a shaft 53 secured by means of the bearings 54 and 54' on the frame of the machine, which shaft has mounted on one of its extremities a pulley 55 for its operation and which receives its movement from a motor (not shown). On the side faces of the above mentioned saw, corresponding sheets 56 and 57 are applied by one of their borders while the other borders are applied to the faces of a disc 58 which is disposed in line with the above mentioned saw. The object of these sheets is to establish a continuity between the surface of the saw and that of the disc 58, which is mounted on a shaft 29, as already seen, and which has fitted furthermore, the wheels 28 and 28'.

The above mentioned disc 58, details of which are illustrated in Figures 5 to 7 inclusive, carries the elements for the extraction of the stones or kernels of the fruit which is already cut, and for which purpose said disk has several openings 59 machined in its body. Three openings are in the case illustrated, within which corresponding knives 60 are disposed, of a curved form and whose extremities 61 and 62 are oriented radially within the body of the disk. Corresponding conical pinions 63 are fitted over each one of the extremities 62 of the knives and are disposed in corresponding hollows machined in the disc 58. The back part of said pinion carries a consolidated disc 64 which has the particularity of having a flat portion 65 cut out of it and which will be explained later.

The above mentioned pinion 63 is placed so as to engage with a sector of a bevelled cog wheel 66 to form an integral part of a fixed disk or similar element 67. The disc has in the zone contiguous to the bevelled wheel or cog-rail and toward its outer edge, a reduced thickness which forms a surface 68. Under these conditions when the pinion 63 reaches its engaging position with the section of the bevelled cog wheel 66, the consolidated disc 64 encounters the surface 68 of the reduced zone and can rotate freely, whereas, when the pinion has passed by the cog-rail, the disk 64 encounters the zone of normal thickness of the disc 67 sitting on it with the corresponding flat portion 65.

The movable elements are joined to one another in order to synchronize their movements, and the transmission of these is produced in the following manner: A driving pulley 69 is mounted on the shaft 29 which transmits its movement to said shaft, and this in turn to a chain wheel 70 mounted on the opposite extremity of the shaft. This wheel transmits the movement by means of a chain 71 to another wheel 72 mounted on the shaft 15 on which is mounted the toothed wheel 14 which hauls the endless chain 11 carrying the spikes. At the same time, the shaft 15 has mounted on it a wheel 73 which hauls a chain 74 and fits over a wheel 75 mounted on shaft 5 on which are mounted the pair of pulleys 7 and 7'. The pulleys 7 and 7' haul the endless belts 8 and 9. In this manner all the movements of the mechanism of the machine are synchronized with one another, which therefore permits a high working velocity and consequently high efficiency.

*Operation.*—Supposing the machine is running, the fruit is being deposited on the endless belts 8 and 9, of part A of the machine, which conduct them in the direction of the arrow F (Figure 1). The operator or operators take the fruit and secure it to the spikes or similar elements 12 disposed on the endless chains 11, which advances in accordance with the arrow F₁, penetrating into part B of the machine, and in said part faced by the pair of cups 37 of the holding elements. These pairs of holding elements are mounted on the corresponding chains 23 and 24 and move in the same direction as the chain 11, at a greater velocity than the said chain as can be noted in Figure 1. On initiating its travel in the above mentioned direction, governed by the stretches 18 and 18' of the guide they are maintained with their respective cups open 37. Then, on advancing they arrive to the stretches 19 and 19' of the guide, which causes them to approach one another so that when they arrive at the stretches 20 and 20', they are able to grip and hold the fruit. As the velocity of these holding elements is greater than that of the chain 11, they separate the fruit from the spikes or similar elements 12, and carry them to the radius of action of the saw 52, while the endless chain 11 with its free spikes returns in its travel backwards. The saw 52, cuts the fruit in two halves including the stone or kernel. The parts are carried by the holding elements until each half of the fruit is applied against the sheets 56 and 57 respectively and conducted towards the disc 58.

It will become apparent from the construction of these sheets that while passing from the circular saw to the disc, the fruit will lose its retention and drop out of the holders or cups.

The holding elements always continue their travel maintaining each half of the fruit on each one of the faces of the disc 58 until they are opposite the corresponding window or opening 59 of the disc where the knives 60 are lodged. As the wheels 28 and 28' which guide the endless chains 23 and 24 are mounted on the same shaft 29 as the disk 58, the holding elements therefore follow a curved path accompanying the displacement of the opening 59 where the knives are found.

When the halves of the fruit are opposite the above mentioned opening 59, the pinion 63 adjacent to the shaft of the knife 60, engages with the cog-rail or bevelled cog wheel 66 of the fixed disk 67. The disc causes it to rotate. This movement is transmitted to the knife—which on turning introduces itself between the pulp of the fruit and its stone, as is illustrated in Figure 5 and on said knife giving a complete turn while it totally separates the stone from the pulp. This complete turn of the knife is produced due to the fact that the length of the cog-rail 66 corresponds to the development of the pinion 63. After this revolution, the knife remains in its original position and unmovable since the pinion, once it has left its engagement with the cog-rail is prevented from turning on account of the flat portion 65 integrally formed in the disk 64 adjacent with the pinion, as was described previously.

The guides which govern the holding elements and whose stretches 20 and 20' terminate in curved ends concentric with the shaft 29, make the holding elements maintain the friut applied against the disk. These guides on terminating in their lower part, allow the holding elements or cups 37 and sliding piece 34 of the pair to recede by the action of the springs 43, separating them and liberating the two halves of the cut fruit as pulp and stone which fall into an appropriate recipient.

After dropping the fruit, the holding elements are conducted again by the endless chains 23 and 24 towards the front part of the body B of the machine, as is illustrated in Figure 2, thereby closing the cycle of its travel.

The practical side and the efficiency of the process can be easily deduced from the above description and representation of the extracting of the stones from the fruit which is carried out by this machine and that due to the special disposition of its constitutive elements it permits a high production efficiency.

It is undoubtedly evident that various modifications of the detail and construction can be introduced to the machine, without departing from the scope of the present invention, which has been clearly put forth in the clauses of the claims which follow this specification:

Having described the present invention in all its details and the form or manner in which same may be put into practice, the following claims are declared as being of the exclusive right and property of the inventor.

We claim:

1. A fruit pitting machine comprising: a conveyor adapted to carry fruit in independent units; an endless chain means on either side of said conveyor at one end thereof extending parallel thereto and adapted to move at a faster linear speed than said conveyor; holding elements on each chain cooperating to engage a fruit on said conveyor; guiding elements adjacent said holding elements controlling the motion thereof; a cutter positioned on a plane between said chains and in the path of the fruit held by said holding elements, a retaining sheet on each side of the cutter supporting the fruit after same is cut; a rotating disc behind said cutter receiving said fruit after it passes the cutter; knives adjacent said disc pitting said fruit, said holding elements further comprising: a bushing mounted on each chain, said bushings axially aligned with each other; a hollow sliding piece mounted in each bushing; a shaft within said hollow piece projecting beyond one end of said sliding piece; a cup at the outwardly extending end of said shaft; anti-friction wheels at the opposite end of said sliding piece; said wheels bearing against said guiding elements; a spring between said bushing and said wheels biasing same against the guiding elements; and a spring between the shaft and sliding piece biasing the shaft to an outward position, whereby opposed cups may engage a fruit therebetween.

2. A fruit pitting machine comprising: a conveyor adapted to carry fruit in independent units; an endless chain means on either side of said conveyor at one end thereof extending parallel thereto and adapted to move at a faster linear speed than said conveyor; holding elements on each chain cooperating to engage a fruit on said conveyor; guiding elements adjacent said holding elements controlling the motion thereof; a cutter positioned on a plane between said chains and in the path of the fruit held by said holding elements; a retaining sheet on each side of the cutter supporting the fruit after same is cut; a rotating disc behind said cutter receiving said fruit after it passes the cutter; knives adjacent said disc pitting said fruit, said holding elements further comprising: a bushing mounted on each chain, said bushings axially aligned with each other; a hollow sliding piece mounted in each bushing; a shaft within said hollow piece projecting beyond one end of said sliding piece; a cup at the outwardly extending end of said shaft; anti-friction wheels at the opposite end of said sliding piece, said wheels bearing against said guiding elements; a spring between said bushing and said wheels biasing same against the guiding elements; a spring between the shaft and sliding piece biasing the shaft to an outward position, whereby opposed cups may engage a fruit therebetween; said guiding elements further comprising elongate parallel strips having an adjustable distance therebetween which converges at the chain portion of the apparatus to force said holding elements into fruit engaging position.

References Cited in the file of this patent

UNITED STATES PATENTS

| | | |
|---|---|---|
| 1,392,520 | Paranteau | Oct. 4, 1921 |
| 1,785,014 | Norgaard | Dec. 16, 1930 |
| 1,901,042 | Robbins | Mar. 14, 1933 |
| 1,915,447 | Robbins | June 27, 1933 |
| 2,234,445 | Matinsen | Mar. 11, 1941 |
| 2,376,526 | Thompson | May 22, 1945 |